United States Patent [19]

Back et al.

[11] 4,001,203
[45] Jan. 4, 1977

[54] HEAVY METAL COMPLEXES OF AZO DYESTUFFS CONTAINING A HETEROCYCLIC DIAZO COMPONENT AND THE RESIDUE OF 5-HALOGENO-2,3-DIHYDROZYPYRIDINE AS COUPLING COMPONENT

[75] Inventors: Gerhard Back, Loerrach, Germany; Alfred Fasciati, Bottmingen, Switzerland

[73] Assignee: Ciba-Geigy AG, Basel, Switzerland

[22] Filed: Apr. 10, 1974

[21] Appl. No.: 459,516

Related U.S. Application Data

[63] Continuation of Ser. No. 140,283, May 4, 1971, abandoned.

[30] Foreign Application Priority Data

May 6, 1970 Switzerland .................... 6784/70

[52] U.S. Cl. .................... 260/146 R; 260/146 D; 260/146 T; 260/147; 260/153; 260/154; 260/155; 260/156; 260/297 R; 260/297 Z
[51] Int. Cl.$^2$ .................... C09B 45/00
[58] Field of Search ............. 260/146 R, 156, 155, 260/147, 146 D, 146 T, 153, 154

[56] References Cited

UNITED STATES PATENTS

| | | | |
|---|---|---|---|
| 1,862,361 | 6/1932 | Dohan et al. ............ | 260/155 |
| 2,294,380 | 9/1942 | Braker .................... | 260/156 |
| 2,431,190 | 11/1947 | Morgan ................... | 260/156 |
| 2,857,372 | 10/1958 | Straley et al. ........... | 260/146 |
| 3,419,570 | 12/1968 | Petersen et al. ......... | 260/156 X |

FOREIGN PATENTS OR APPLICATIONS

| | | | |
|---|---|---|---|
| 79,150 | 9/1962 | France .................... | 260/155 |
| 447,226 | 5/1936 | United Kingdom ...... | 260/155 |

*Primary Examiner*—Charles F. Warren
*Attorney, Agent, or Firm*—Joseph G. Kolodny; Edward McC. Roberts; Prabodh I. Almaula

[57] ABSTRACT

Heavy metal complexes can be prepared from azo compounds that contain a heterocyclic diazo component containing a complex-forming group such as hydroxyl, carboxyl, alkoxy or amino, or containing a hetero nitrogen atom able to form a coordinate bond, exemplified by quinolinyl and benzthiazolyl. The coupling component is 5-halogeno-2,3-dihydroxypyridyl where halogen is preferably chloro or bromo. The dyestuffs are useful, inter alia, for dyeing natural and synthetic polyamides such as wool and nylon. The dyeings obtained are uniform, are resistant to acid and alkali, are fast to light and to rubbing and barely change their appearance in artificial light.

5 Claims, No Drawings

HEAVY METAL COMPLEXES OF AZO DYESTUFFS CONTAINING A HETEROCYCLIC DIAZO COMPONENT AND THE RESIDUE OF 5-HALOGENO-2,3-DIHYDROZYPYRIDINE AS COUPLING COMPONENT

This is a continuation of application Ser. No. 140,283, filed on May 4, 1971, now abandoned.

The present invention relates to heavy metal complexes of azo compounds which contain, as the radical of the diazo component, a heterocyclic radical which possesses a complex-forming position separated from the azo group by one or two atoms, and contain, as the radical of the coupling component, the radical of a halogeno-2,3-dihydroxypyridine.

Possible complex-forming positions are ionisable complex-forming groups, such as, for example, hydroxyl, carboxyl, alkoxy or amino groups, and above all non-ionisable coordination positions, such as, for example, nitrogen atoms.

The one or two atoms which separate the azo group from the complex-forming position can be heteroatoms such as, for example, oxygen or sulphur atoms, bonded into or onto the ring, or can preferably be carbon atoms.

Products of particular importance are heavy metal complexes of azo compounds wherein three ring atoms of the heterocyclic diazo component together with the azo bridge form, in one of the possible (mesomeric or tautomeric) limiting forms, a system of conjugated double bonds of the structure

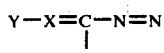

(1)

wherein one of the symbols X and Y denotes a nitrogen atom and the other denotes a nitrogen or carbon atom.

Possible complex-forming metals are, for example, iron, cobalt, chromium and especially copper and nickel. The complexes can contain one or two molecules of an appropriate azo compound per one atom of the complex-forming metal (1:1 and 1:2 complexes, respectively). However, both ligand molecules of a 1:2 complex must correspond to the definition given above. The 1:1 copper complex compounds or 1:1 nickel complex compounds according to the invention should above all be singled out.

The heterocyclic diazo components are preferably 5-membered or 6-membered heterocyclic radicals. These radicals can, in particular, possess two or more heteroatoms, above all nitrogen atoms, such as, for example in the imidazole, thiadiazole or triazole radical, or they can contain a fused-on benzene radical such as, for example, in the quinoline radical. The azo group can be bonded to the heterocyclic structure itself or to the fused-on radical which is free of hetero-atoms. The diazo radicals can contain further substituents such as, for example, halogen atoms, nitro, alkyl, alkoxy, aryl, phenyl, acylamino, carboxyl or arylazo groups and especially sulphonic acid groups and reactive radicals, above all reactive atoms bonded via amino groups or aliphatic carboxylic acid radicals containing reactive atom groups, such as, for example, the α,β-dibromopropionyl or α-bromoacryl radical, bonded via amino groups.

The radical of the coupling component is preferably the radical of 5-bromo-2,3-dihydroxypyridine.

Products of interest are heavy metal complexes of azo compounds of the formula

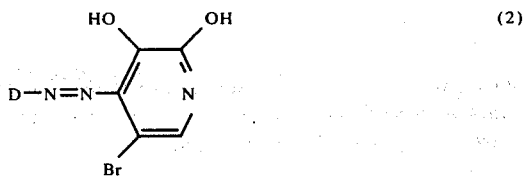

wherein D is a quinoline radical bonded in the 8-position, and especially heavy metal complexes of azo compounds which correspond to the formula

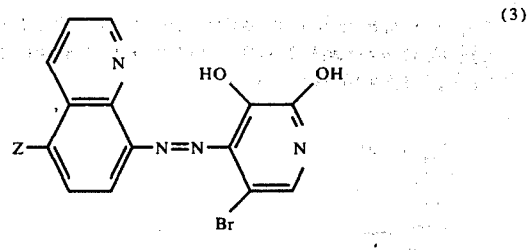

in which Z represents a halogen atom, for example a chlorine atom, a sulphonic acid group or acylamino group, such as the acetylamino group, or an arylazo group. A possible arylazo group is especially the phenylazo group, which preferably contains a reactive radical, as, for example, in the disazo compound of the formula

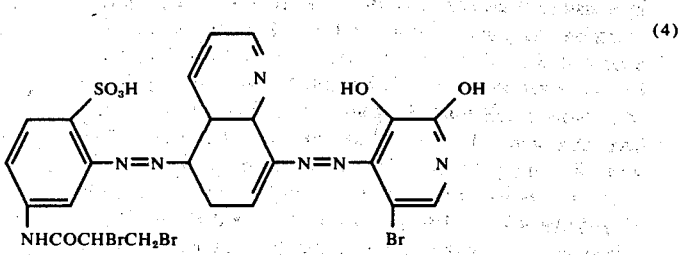

The diazo radicals which form a structure corresponding to the formula (1), do not have to contain any of the customary complex-forming groups, such as, for example, hydroxyl, carboxyl or alkoxy groups, since the metal atom is coordinatively bonded, not only to the HO group, in the ortho-position to the azo group, of the radical of the coupling component, but also to the azo group and to the nitrogen atom contained in the heterocyclic diazo radical and possessing a lone electron pair. In this way a metal atom for example forms a five-membered and a six-membered ring with a molecule of the formula (3), and correspondingly forms two five-membered and two six-membered rings with two molecules of the formula (3), these being structures which are distinguished by particular stability. The charge of the ion containing the metal atom depends on whether acid groups, especially sulphonic acid groups, or basic groups, such as, for example, quaternised amino groups, are present.

Structures of the formula (1) wherein X denotes a nitrogen atom and Y denotes a carbon atom, are for example present in azo compounds which contain the radical of 2-aminothiazole

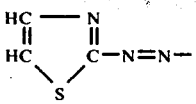

A corresponding azo compound, in which X and Y are nitrogen atoms, for example contains the radical of 5-amino-2-phenyl-1,3,4-thiadiazole

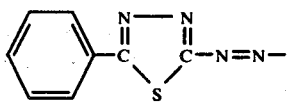

The case wherein X is a carbon atom and Y is a nitrogen atom is realised in compounds which contain the radical of 8-amino-quinoline

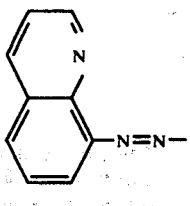

which in the mesomeric limiting form represented above also has the structure with two conjugated double bonds which corresponds to the formula (1)

Amongst the heavy metal complexes according to the invention, interest attaches both to those which do not contain any groups which confer solubility in water and, above all, to those which are water-soluble, that is to say contain, for example, sulphonic acid groups or carboxylic acid groups. In particular, the compounds can possess one, or more than one, reactive radical, which is in particular present in the diazo component.

Possible reactive radicals are groupings capable of reaction with the hydroxyl groups of cellulose or the amino groups of polyamides to form a covalent chemical bond. Such a grouping in particular represents a low molecular alkanoyl or alkylsulphonyl radical which is substituted by a removable atom or a removable group, a low molecular alkenoyl or alkenesulphonyl radical which is optionally substituted by a removable atom or a removable group, a carbocyclic or heterocyclic radical, containing 4-membered, 5-membered or 6-membered rings, which is substituted by a removable atom or a removable group via a carbonyl or sulphonyl group, or a triazine or pyrimidine radical bonded directly via a carbon atom and substituted by a removable atom or a removable group, or contains one of these. The preferred reactive radical is an aliphatic, saturated or unsaturated acyl radical which preferably contains halogen atoms and is bonded via a —NH— group, in particular the α,β-dibromopropionyl or α-bromoacrylyl radical.

The manufacture of the complex compounds according to the invention is carried out by reacting azo compounds of the type described with metal donors in such a way that metal complexes are produced which per molecule of azo compound contain one or a half atom of metal bonded as a complex. Accordingly, the metallisation is appropriately carried out with such metal donors and according to such methods as yield, according to experience, complex compounds of this composition.

The manufacture of 1:2 complexes can be carried out in a single reaction step, by reaction of 1 mol of a heavy metal-donating compound with 2 mols of appropriate azo compounds, or can be carried out in stages. In the latter case, an appropriate azo compound, for example a compound of the formula (3), is reacted with a preferably chromium-donating agent to give a 1:1 complex, and this complex is subsequently reacted with an equivalent amount of an appropriate metal-free azo compound to give the 1:2 complex.

This procedure is particularly advisable if 1:2 chromium complexes are to be manufactured with dissimilar ligands but which, according to the invention, must both correspond to the definition given initially.

Instead of reacting a 1:1 chromium complex compound with a suitable second component, as described above, in a molar ratio of 1:1, it is also possible to react the non-metallised azo compounds used as starting substances, in a molar ratio of 1:1, simultaneously with a metal donor in a solvent mixture, this constituting so-called mixed metallisation.

The reaction with the heavy metal donor takes place according to customary processes, in various solvents such as, for example, water, ethanol, formamide, glycol ethers, pyridine and others, depending on the solubility of the components, optionally at elevated temperature, in a weakly acid to alkaline medium.

The reaction is advantageously carried out with warming, in an open vessel or under pressure, optionally in the presence of suitable additives such as, for example, salts of organic acids, of bases or of other agents which promote complex formation.

Particularly valuable complex compounds are obtained if copper (II) salts or nickel (II) salts are used as metal donors.

As copper donors it is for example possible to use salts which contain copper as a cation, such as, for example, copper sulphate or copper acetate. In some cases the use of complex copper compounds is of advantage, for example in the form of copper-ammine complexes, such as copper tetrammine sulphates from copper sulphate and ammonia, pyridine or monoethanolamine, or in the form of compounds which contain the copper bonded as a complex, for example complex copper compounds of the alkali salts of aliphatic aminocarboxylic acids, hydroxycarboxylic acids or dicarboxylic acids, such as of glycine, of glycollic acid, of lactic acid, of oxalic acid and above all of tartaric acid, such as sodium copper tartrate, of aliphatic tricarboxylic acids, such as citric acid, or aromatic hydroxycarboxylic acids, such as, for example, of salicylic acid.

The treatment with a copper donor can take place according to methods which are in themselves known, for example at room temperature if dealing with easily metallisable starting compounds, or by warming to temperatures between 50° and 120° in an open vessel, for example under reflux cooling, or optionally in a closed vessel under pressure, the $p_H$ conditions being determined by the type of metallisation process chosen; for example, copper is introduced under acid conditions with copper sulphate, and under alkaline conditions with copper tetrammine sulphate. If desired, solvents, such as, for example, alcohol, dimethylformamide and the like can also be added during the metallisation.

Corresponding statements apply to the treatment with nickel donors.

When converting to the metal complexes, a single azo compound is preferentially employed as the starting substance.

The azo compounds used as starting products are manufactured by coupling diazotised primary heterocyclic amines with halogeno-2,3-dihydroxy-pyridines.

The diazotisation of the heterocyclic amines is carried out according to methods which are in themselves known, for example with the aid of hydrochloric acid and sodium nitrite. The coupling with the halogeno-2,3-dihydroxy-pyridines is also carried out according to methods which are in themselves known, in an acid to alkaline medium.

After completion of the coupling reaction, the compounds can, for metallisation purposes, be separated from the coupling mixture by filtration. They are appropriately used as a filter cake without intermediate drying. In some cases it is also possible to carry out the treatment with the metal donors directly in the coupling mixture, without an intermediate separation.

The diazo components can be substituted further, for example by chlorine or bromine atoms, nitro, nitrile, lower alkyl, preferably methyl, lower alkoxy, preferably methoxy, lower alkylsulphonyl, such as methylsulphonyl and ethylsulphonyl, sulphonic acid, carboxylic acid, sulphonamide and substituted sulphonamide, for example N-lower alkyl-sulphonamide and N-lower hydroxyalkylsulphonamide, for example N-methylsulphonamide, N,N-diethylsulphonamide, N-($\beta$-hydroxyethyl)-sulphonamide and N,N-di($\beta$-hydroxyethyl)-sulphonamide, substituted or unsubstituted phenylazo or naphthylazo, acylamino, such as formylamino, acetylamino or benzoylamino, benzenesulphonamide, p-toluenesulphonylamino, methanesulphonylamino, carboxymethoxyamino, carboethoxyamino, dimethylaminosulphonylamino and carboisopropoxyamino groups, as well as by reactive groups.

As examples of primary heterocyclic amines which can be used for the manufacture of the azo compounds there may be mentioned: 2-aminopyridine, 2-aminoquinoline, 2-aminobenzthiazole, 2-amino-6-methoxy-benzthiazole, 2-amino-6-nitro-benzthiazole, 3-amino-indazole, 3-amino-6-chloroindazole, 3-amino-6-methoxy-indazole, 7-amino-indazole, 7-amino-4-nitro-indazole, 5-aminotrazole-3-carboxylic acid, 3-amino-4-phenyl-5-methylpyrazole, 4-amino-benztriazole, 7-amino-5-chloro-benzimidazole, 4-amino-5-chloro-benzthiazole, 2-aminothiazole, 2-amino-4-methyl-thiazole, 3-amino-1,2,4-triazole, 5-amino-1,2,4-triazole, 1-phenyl-2,3-dimethyl-4-amino-pyrazol-5-one, 5-amino-2-phenyl-1,3,4-thiadiazole, 5-amino-3-phenyl-1,2,4-thiadiazole, 8-aminoquinoline, 8-aminoquinoline-5-sulphonic acid, 5-chloro-8-aminoquinoline, 5-acetylamino-8-aminoquinoline, 2-methyl-8-aminoquinoline, 4-aminoacridine, 1-aminocarbazole, 2-amino-5-nitro-thiazole, 5-amino-3-pyridyl-1,2,4-thiadiazole, 4-amino-3-methyl-pyrazolone(5), 5,7-dibromo-8-amino-quinoline, 8-amino-5-(4'-sulphophenylazo)-quinoline, 5-(2'-sulpho-5'-$\alpha,\beta$-dibromopropionylamino-1'-phenylazo)-8-aminoquinoline, 2-amino-5-methylthio-1,3,4-thiadiazole, 2-amino-5-ethylthio-1,3,4,-thiadiazole, 2-amino-5-phenylthio-1,3,4-thiadiazole, 2-amino-5-cyclohexylthio-1,3,4-thiadiazole, 2-amino-5-methylsulphonyl-1,3,4-thiadiazole, 2-amino-5-methyl-1,3,4-thiadiazole, 2-amino-5-acetylamino-1,3,4-thiadiazole, 2-amino-5-phenylsulphoyl-1,3,4-thiadiazole, 2-amino-5-chloro-1,3,4-thiadiazole, 2-amino-5-carbomethoxyethyl-1,3,4-thiadiazole, 3-amino-2,1-benzisothiazole, 3-amino-5-methyl-2,1-benzisothiazol 3-amino-4-ethyl-2,1-benzisothiazole, 3-amino-4,7-dimethyl-2,1-benzisothiazole, 3-amino-4-methoxy-2,1-benzisothiazole, 3-amino-5-, -6- or -7-chloro-2,1-benzisothiazole, 3-amino-5,7-dichloro or -dibromo-2,1-benzisothiazole, 3-amino-4-, -5-, -6- or -7-bromo-2,1-benzisothiazole, 3-amino-5- or -6-cyano-2,1-benzisothiazole, 3-amino-4,6-dichloro-5-cyano-2,1-benzisothiazole, 3-amino-7-chloro-5-cyano-2,1-benzisothiazole, 3-amino-5-chloro-7-cyano-2,1-benzisothiazole, 3-amino-4-methyl-6-cyano-2,1-benzisothiazole, 3-amino-4-, -5-, -6- or -7-nitro-2,1-benzisothiazole, 3-amino-5,7-dinitro-2,1-benzisothiazole, 3-amino-5-nitro-7-chloro-2,1-benzisothiazole, 3-amino-5-nitro-7-bromo-2,1-benzisothiazole, 3-amino-5-(N-methyl-sulphonamido)-2,1-benzisothiazole, 3-amino-5-(N,N-dimethylsulphonamide)-2,1-benzisothiazole and 3-amino-5-methylsulphonyl-2,1-benzisothiazole.

Possible coupling components are especially 5-bromo-2,3-dihydroxy-pyridine and 5-chloro-2,3-dihydroxy-pyridine.

Heavy metal complexes which contain one or more reactive groups can be manufactured by using diazo components which already contain reactive groups. In many cases it is however also possible to introduce reactive groups subsequently into the azo compounds. The introduction can be effected after coupling or after metallisation. Compounds which contain a six-membered heterocyclic reactive radical bonded via an amino group, or an aliphatic reactive radical containing not more than three carbon atoms, are of particular interest.

The reactive radical is preferably introduced by acylation of appropriate azo compounds which contain an amino group which can be acylated, or of corresponding diazo compounds which apart from the amino group to be diazotised contain yet a further amino group which can be acylated or a group which can be converted into an amino group which can be acylated, for example by reduction or saponification, such as, for example, the nitro group or the acetylamino group.

As such compounds, there should especially be mentioned heterocyclic diazo components which contain an aminoarylazo group, such as, for example, 5-(3'-amino-4'-sulphophenylazo)-8-amino-quinoline, 5-(4'-amino-2'-sulphophenylazo)-8-amino-quinoline or 5-(4'-amino-2'-,5'-disulphophenylazo)-8-amino-quinoline, which can be converted into reactive diazo components by acylation of the amino group bonded to the phenyl radical.

Possible azo compounds into which it is possible to introduce reactive radicals (that is to say after coupling or after metallisation) are, according to the invention, the coupling products of the abovementioned diazo components with halogeno-2,3-dihydroxy-pyridines. Depending on the starting substances, heavy metal complexes which contain more than one reactive group in the final compound are under certain circumstances also produced.

Possible acylating agents which contain a reactive radical in addition to the acylating position are especially the halides or anhydrides of organic acids which contain easily replaceable atoms or groups of atoms.

The following may be mentioned as examples of acylating agents containing a reactive radical: chloroacetyl chloride or bromoacetyl chloride, β-chloropropionyl chloride or β-bromopropionyl chloride, α,β-dichloropropionyl chloride or α,β-dibromopropionyl chloride, chloromaleic anhydride, carbyl sulphate, acrylyl chloride, β-chloroacrylyl or β-bromoacrylyl chloride, α-chloroacrylyl or α-bromoacrylyl chloride, α,β-dichloroacrylyl or dibromoacrylyl chloride, trichloroacrylyl chloride, chlorocrotonyl chloride, propiolic acid chloride, 3,5-dinitro-4-chlorobenzene-sulphonic acid chloride or -carboxylic acid chloride, 3-nitro-4-chlorobenzene-sulphonic acid chloride or -carboxylic acid chloride, 2,2,3,3-tetrafluorocyclobutane-1-carboxylic acid chloride, β-chloroethylsulphonyl-endomethylene-cyclohexanecarboxylic acid chloride, acrylylsulphonyl-endomethylene-cyclohexanecarboxylic acid chloride, and above all heterocyclic acid halides and their derivatives, such as the 2-chlorobenzoxazolecarboxylic acid chlorides, 2-chlorobenzthiazolecarboxylic acid chlorides or 2-chlorobenzthiazolesulphonic acid chlorides, and above all the following compounds, possessing at least 2 nitrogen atoms as hetero-atoms of the 6-membered heterocyclic structure: 4,5-dichloro-1-phenyl-pyridazonecarboxylic acid chloride or -sulphonic acid chloride, 4,5-dichloropyridazonepropionic acid chloride, 1,4-dichlorophthalazinecarboxylic acid chloride or -sulphonic acid chloride, 2,3-dichloroquinoxalinecarboxylic acid chloride or -sulphonic acid chloride, 2,4-dichloroquinazolinecarboxylic acid chloride or -sulphonic acid chloride, 2-methanesulphonyl-4-chloro-6-methylpyrimidine, tetrachloropyridazine, 2,4-bis-methanesulphonyl-6-methylpyrimidine, 2,4,6-trichloropyrimidine or 2,4,5,6-tetrachloropyrimidine, 2,4,6-tribromopyrimidine or 2,4,5,6-tetrabromopyrimidine, 2-methanesulphonyl-4,5-dichloro-6-methylpyrimidine, 2,4-dichloropyrimidine-5-sulphonic acid, 5-nitro- or 5-cyano-2,4,6-trichloropyrimidine, 2,6-bis-methanesulphonylpyridine-4-carboxylic acid chloride, 2,4-dichloro-5-chloromethyl-6-methyl-pyrimidine, 2,4-dibromo-5-bromomethyl-6-methyl-pyrimidine, 2,4-dichloro-5-chloromethylpyrimidine, 2,4-dibromo-5-bromomethylpyrimidine, 2,5,6-trichloro-4-methylpyrimidine, 2,6-dichloro-4-trichloromethylpyrimidine or especially 2,4-dimethanesulphonyl-5-chloro-6-methylpyrimidine, 2,4,6-trimethanesulphonyl-1,3,5-triazine, 2,4-dichloropyrimidine, 3,6-dichloropyridazine, 3,6-dichloropyridazine-5-carboxylic acid chloride, 2,6-dichloro- or 2,6-dibromo-4-carboethoxypyrimidine, 2,4,5-trichloropyrimidine, 2,4-dichloropyrimidine-6-carboxylic acid chloride, 2,4-dichloropyrimidine-5-carboxylic acid chloride, 2,6-dichloro- or 2,6-dibromo-pyrimidine-4- or -5-carboxylic acid amides or -sulphonic acid amides or -4- or -5-sulphonic acid chloride, 2,4,5,6-tetrachloropyridazine, 5-bromo-2,4,6-trichloropyrimidine, 5-acetyl-2,4,6-trichloropyrimidine, 5-nitro-6-methyl-2,4-dichloropyrimidine, 2-chlorobenzthiazole-6-carboxylic acid chloride, 2-chlorobenzthiazole-6-sulphonic acid chloride, 5-nitro-6-methyl-2,4-dichloropyrimidine, 2,4,6-trifluoro-5-chloropyrimidine, 2,4,5,6-tetrafluropyrimidine and 2,4,5-trifluoropyrimidine, 2,4,6-trichloro(-tribromo or -trifluoro)-1,3,5-triazine, as well as 4,6-dichloro(-dibromo or -difluoro)-1,3,5-triazines which are substituted in the 2-position by an aryl or alkyl radical, for example a phenyl, methyl or ethyl radical, or by the radical of an aliphatic or aromatic mercapto compound bonded via the sulphur atom or hydroxyl compound bonded via the oxygen atom, or especially by an NH$_2$ group or by the radical of an aliphatic, heterocyclic or aromatic amino compound bonded via the nitrogen atom. As such compounds, the radicals of which are bonded to the triazine nucleus in the 2-position by reaction with trihalogenotriazines, the following may, for example, be mentioned: aliphatic or aromatic mercapto or hydroxyl compounds, such as thioalcohols, thioglycollic acid, thiophenols, alkoxyalkanols, methyl alcohol, ethyl alcohol, isopropyl alcohol, glycollic acid, phenol, chlorophenols or nitrophenols, phenolcarboxylic acids and phenolsulphonic acids, naphthols, naphtholsulphonic acids and the like, but especially ammonia and compounds containing amino groups which can be acylated, such as hydroxylamine, hydrazine, phenylhydrazine, phenylhydrazinesulphonic acids, glycol monoalkyl ethers, methylamine, ethylamine, isopropylamine, methoxyethylamine, methoxypropylamine, dimethylamine, diethylamine, methylphenylamine, ethylenephenylamine, chloroethylamine, ethanolamines, propanolamines, benzylamine, cyclohexylamine, morpholine, piperidine, piperazine, aminocarbonic acid esters, aminoacetic acid ethyl ester, aminoethanesulphonic acid, N-methylaminoethanesulphonic acid, but above all aromatic amines, such as aniline, N-methylaniline, toluidines, xylidines, chloroanilines, p- and m-aminoacetanilide, aminophenols, anisidine, phenetidine and especially anilines containing an acid group, sulphanilic, methanilic and orthanilic acid, anilinedisulphonic acid, aminobenzylsulphonic acid, aniline-ω-methanesulphonic acid, aminobenzodicarboxylic acids, naphthylaminomonosulphonic, -disulphonic and -trisulphonic acids, aminobenzoic acids, such as 2-hydroxy-5-aminobenzoic acid, and also coloured compounds, or compounds possessing dyestuff character, for example 4-nitro-4'-amino-stilbenedisulphonic acid, 2-nitro-4'-amino-diphenylamino-4,3'-stilbenedisulphonic acid, 2-nitro-4'-aminodiphenylamine-4,3'-disulphonic acid and especially aminoazo dyestuffs or aminoanthraquinones or phthalocyanines which still contain at least one reactive amino group.

The introduction of the substituent which is in the 2-position of the triazine radical can also take place after the condensation with the starting diamine or after the reaction, according to the invention, to give the azo compound.

Apart from the fibre-reactive radicals which can be introduced by acylation, examples of other fibre-reactive radicals which should also be mentioned are the vinylsulphone, β-sulphatoethylsulphone or β-thiosulphateoethylsulphone, β-thiosulphatopropionylamide, β-thiosulphatoethylsulphonylamide or sulphonic acid-N,β-sulphatoethylamide group, which are introduced into the diazo component in a different way, for example by ester formation or thioester formation.

As compounds which contain a fibre-reactive radical which cannot be introduced by acylation, that is to say in which the fibre-reactive radical is preferably not bonded via an amino group but is directly bonded to the benzene radical, the sulpho-esters of the following sulphones may especially be mentioned: 1-amino-2-methoxy-5-($\beta$-hydroxyethyl)-phenylsulphone, 1-aminobenzene-3- or -4-$\beta$-hydroxyethylsulphone, 1-amino-2-methyl-benzene-5-$\beta$-hydroxyethylsulphone, 1-amino-4-($\beta$-hydroxyethylsulphonylpropionylaminomethyl)-benzene, 1-amino-4-($\beta$-hydroxyethylsulphonylamino)benzene and also reactive compounds obtainable via appropriate methylols according to Einhorn's method, such as, for example, 1-amino-4-chloroacetylamino-methylbenzene or 1-amino-3-chloroacetylamino-methylbenzene-6-sulphonic acid.

The condensation with the acid halides or anhydrides or with the heterocyclic halogen compounds is appropriately carried out in the presence of acid-binding agents such as, for example, sodium carbonate or sodium hydroxide, and under such conditions that an unsaturated bond or a replaceable halogen atom still remains in the final product, that is to say, for example, in organic solvents or at relatively low temperatures in aqueous media.

The 1:1 heavy metal complexes, especially the 1:1 cobalt complexes, of the azo compounds according to the invention can be stabilised by addition of several, especially of three, organic radicals which are bonded to the metal atom via nitrogen atoms.

Of the radicals which form a chelate complex with metal via a primary, secondary or tertiary nitrogen atom, at least two, and preferably all three, belong to one and the same, preferably aliphatic, polyamine, and this polyamine contains three, or preferably two, further atoms between the individual nitrogen atoms, so that the chelate complex or complexes produced are 6-membered, or preferably 5-membered, if the metal atom is included. Examples of such polyamines which may be mentioned are: diaminoalkylenes, wherein the alkylene bridge consists of 3, or preferably 2, carbon atoms, or N-alkyl, N-aminoalkyl or C-aminoalkyl derivatives thereof, for example ethylenediamine, 1,2- or 1,3-diaminopropane, 1,2- or 1,3-diamino-n-butane, $\beta$-(methylamino)-ethylamine, $\beta$-(ethylamino)-ethylamine, $\beta$-(dimethylamino)-ethylamine, N-($\beta$-hydroxyethyl)-ehtylenediamine, N,N'-dimethylethylenediamine, N,N',N''-trimethylethylenediamine and N,N',N'',N'''-tetramethylethylenediamine, but especially diethylenetriamines, triethylenetetramines, tetraethylenepentamines, dipropylenetriamines and the like, such as, for example, the amines of the formulae:

NH$_2$—CH$_2$—CH$_2$—NH-CH$_2$—CH$_2$—NH$_2$

NH$_2$—CH$_2$—CH$_2$—NH—CH$_2$—CH$_2$—NH—CH$_2$—CH$_2$—NH$_2$

NH$_2$—CH$_2$—CH$_2$—NH—CH$_2$—CH$_2$—NH—CH$_2$—CH$_2$—NH—CH$_2$—CH$_2$—NH$_2$

NH$_2$—CH$_2$—CH$_2$—CH$_2$—NH—CH$_2$—CH$_2$—CH$_2$—NH$_2$

If a diamine is used, the third ligand bonded as a complex to the metal atom can be ammonia or a primary, secondary or tertiary amine, for example methylamine, ethylamine, monoethanolamine and diethanolamine, dimethylamine, diethylamine, benzylamine, aniline, triethanolamine, piperidine or pyridine.

Especially in the case of the cobalt complexes, the new compounds are appropriately manufactured by metallising the mixture of the azo compound and of the amine or amines with cobalt-donors, in which case the reaction takes place practically instantaneously. Where an alkoxy group is present in the adjacent position to the azo group, the alkoxy group is converted in the usual manner (temporarily) into a hydroxyl group during the metallisation (so-called dealkylating metallisation). It is also possible first to manufacture the corresponding 1:2 cobalt-amine complexes by reaction of the amines mentioned with cobalt donors, and then to convert the former, by reaction with a metallisable azo compound, into the complexes. The chromium complexes can appropriately be manufactured by first manufacturing the 1:1 chromium complex of the azo compound and then reacting it with the amine or the amines.

In carrying out the first of the manufacturing processes mentioned above, it is generally advisable to use the metallising agent, the azo compound and the amine or the amines approximately in the stoichiometric amounts required in accordance with the composition of the end product. It is furthermore generally advisable to carry out the metallisation in a weakly acid to alkaline medium. Simple cobalt salts, such as cobalt sulphate, or, if appropriate, freshly precipitated cobalt hydroxide, are preferably used as cobalt donors. Using these simple cobalt salts, the treatment according to the invention can also be carried out in a weakly acid medium.

The conversion into the complex cobalt compounds is advantageously carried out with warming, in an open vessel or under pressure, for example at the boiling point of the reaction mixture, and optionally in the presence of suitable additives, for example in the presence of salts of organic acids, or the presence of bases, organic solvents, such as, for example, glycol monomethyl ether, ethanol or n-butanol, or further agents which assist complex formation.

Surprisingly, these amine complexes, which contain neither sulpho groups nor carboxyl groups, in the azo compound, not only show excellent solubility in alcohol, but in part also show good solubility in water.

The metal-containing, especially copper-containing or nickel-containing, azo compounds obtainable according to the present process and its variants are new; they are suitable for dyeing and printing the most diverse substances, but above all for dyeing animal materials such as silk, leather and especially wool, though they are also suitable for dyeing and printing synthetic fibres of polyamides or polyurethanes, polyacrylonitrile fibres and the like.

If no sulphonic acid groups or similar groups are present, the solubility in water of the metal complex compounds according to the invention is greatly reduced. Instead, far better solubility in organic solvents result. If no substituents which can be solvated, such as, for example, a sulphonamide group or nitro group, are present, the solubility in organic solvents is only moderate.

The complexes having one or more sulphonic acid groups are especially suitable for use as dyestuffs for wool, silk, leather and especially polyamides. The complexes containing sulphonamide groups can be used as lacquer dyestuffs and as dystuffs for the spin dyeing of polyamides. If the complexes which possess a fibre-reactive group contain two or more sulphonic acid groups, they can be employed as reactive dyestuffs in the usual manner; if sulphonic acid groups are entirely absent, the products are reactive dispersion dyestuffs.

The heavy metal complexes according to the invention which contain a cationic charge can especially be used as dyestuffs for polyacrylonitrile fibres.

The new dyestuffs can be used for dyeing nitrogen-containing fibres, such as wool, for example from baths wherein the acidity ranges from that due to acetic acid to neutrality, and if appropriate, that is to say when using dyestuffs of only restricted solubility in water, with the addition of suitable dispersing agents. Especially when using complexes of good solubility in water, that is to say containing two or more sulpho groups in the azo compound, dyeing is appropriately carried out with the addition of the assistants customary in dyeing practice.

Furthermore, nitrogen-containing fibres, especially wool, can be dyed advantageously with the dyestuffs manufactured according to the present process if the fibres are treated, appropriately in a continuous process, for example on a padder, with an aqueous preparation which contains a wool dyestuff and an assistant which, with water and optionally with additives, is capable of forming a system of two liquid phases with a miscibility gap wherein the ratio of the water, optionally containing additives, and the assistant lies within the miscibility gap or near it, the miscibility gap is already present at a relatively low content of assistants, and over a large range of the miscibility gap the phase which contains more assistant accounts for a substantial part, and thereafter the material provided with the aqueous preparation is subjected to a heat treatment.

The dyeings and prints obtainable with the new dyestuffs are as a rule distinguished by uniformity, resistance to acid and alkali, good fastness to light and good fastness to rubbing; as a rule, they hardly change their appearance in artificial light, and in part they show very interesting and valuable shades.

The new dyestuffs yield particularly pure shades when dyeing polyamide goods, especially when dyeing material of nylon-6,6.

In the example which follows the parts, unless otherwise stated, denote parts by weight, and the percentages denote percentages by weight. The relationship of parts by weight to parts by volume is the same as of the gram to the cm³.

EXAMPLE 22.4 parts of 8-aminoquinoline-5-sulphonic acid are indirectly diazotised in a known manner, and subsequently coupled with 19 parts of 2,3-dihydroxy-5-bromopyridine. The monoazo dyestuff of the following structure

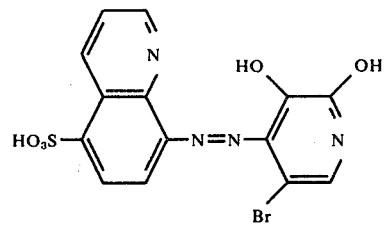

which is produced in excellent yield is precipitated from the coupling mixture by adding sodium chloride, and is isolated by filtration and dried in vacuo.

8.5 parts of the dyestuff obtained are dissolved in 200 parts of water at 80° C, the mixture giving a neutral reaction. After adding a solution of 5 parts of coppper sulphate pentahydrate and 5 parts of crystalline sodium acetate in 50 parts of water, the mixture is stirred for a further 30 minutes at 80° C. The originally reddish-violet starting dyestuff is now present as a clear solution of the blue 1:1 copper complex and is separated out by adding sodium chloride, isolated by filtration and dried.

Polyamide fibres are dyed from a weakly acid bath in pure, reddish-blue shades having good fastness properties.

If, in the same procedure, 6 parts of nickel sulphate heptahydrate or 3 parts of cobalt-II sulphate heptahydrate are used instead of copper sulphate, the corresponding 1:1 nickel complex and 1:2 cobalt complex are respectively produced, and polyamide fibres can be dyed with these, from a weakly acid bath, in pure, greenish-blue shades.

8.5 parts of the abovementioned dyestuff in 200 parts of water at 80° C, and 20 parts by volume of 1 normal sodium hydroxide solution are stirred together. After adding 30 parts by volume of a solution of sodium disalicylato-chromate-III, containing 3% by weight of $Cr_2O_3$, the reaction mixture is kept at the boil, whilst stirring, until the starting dyestuff is no longer detectable. The resulting, easily water-soluble 1:2 chromium complex is obtained by evaporating the solution; it dyes polyamide fibres, from a weakly acid bath, in fast bluish-green shades.

The first two columns of the table which follows list, respectively, diazo components and coupling components from which azo compounds can be obtained correspondingly to the preceding example, and these azo compounds, when reacted with the metals mentioned in the third column to give complexes, produce the colour shades indicated in the fourth column.

| No. | Diazo Component | Azo Component | Metal | Shade on Polyamide |
|---|---|---|---|---|
| 1 | (8-aminoquinoline structure with NH₂) | (Cl-substituted dihydroxypyridine structure with OH, OH) | Copper | blue |
| 2 | " | " | Nickel | greyish-blue |
| 3 | " | " | Cobalt | greenish- |

-continued
| No. | Diazo Component | Azo Component | Metal | Shade on Polyamide |
|---|---|---|---|---|
| | | | | blue |
| 4 | 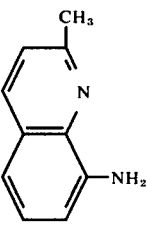 | 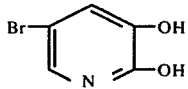 | Copper | blue |
| 5 | '' | '' | Nickel | greenish-blue |
| 6 | 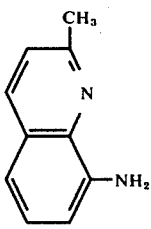 | 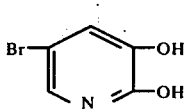 | Cobalt | greenish-blue |
| 7 | '' | '' | Chromium | greyish-blue |
| 8 | 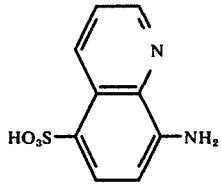 | 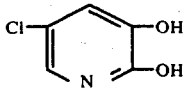 | Copper | blue |
| 9 | '' | '' | Nickel | greenish-blue |
| 10 | 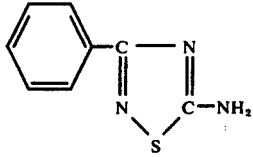 | 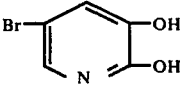 | Cobalt | bluish-violet |
| 11 | 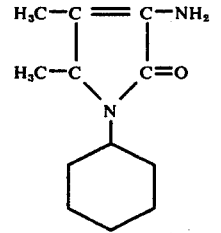 | '' | Copper | claret |
| 12 | 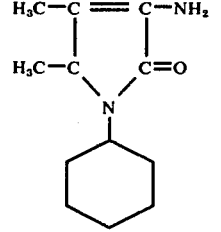 | 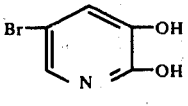 | Nickel | bluish-red |

-continued

| No. | Diazo Component | Azo Component | Metal | Shade on Polyamide |
|---|---|---|---|---|
| 13 | (3-sulfophenyl)-N=N-(8-aminoquinolin-5-yl) | '' | Copper | greenish-blue |
| 14 | '' | '' | Nickel | bluish-green |
| 15 | '' | '' | Cobalt | green |
| 16 | (2-sulfo-4-(2,3-dibromopropionylamino)phenyl)-N=N-(8-aminoquinolin-5-yl) | 5-bromo-2,3-dihydroxypyridine | Copper | blue |
| 17 | '' | '' | Nickel | greenish-blue |
| 18 | (2-sulfo-4-(2,3-dibromopropionylamino)phenyl)-N=N-(8-aminoquinolin-5-yl) | 5-bromo-2,3-dihydroxypyridine | Cobalt | green |
| 19 | 6-chloro-3-amino-4,5,6,7-tetrahydroindazole | '' | Copper | violet |
| 20 | '' | '' | Nickel | reddish-violet |
| 21 | '' | '' | Cobalt | blue |
| 22 | 5-bromo-8-aminoquinoline | 5-chloro-2,3-dihydroxypyridine | Copper | blue |
| 23 | '' | '' | Nickel | greenish-blue |
| 24 | 6-methoxy-8-aminoquinoline | 5-bromo-2,3-dihydroxypyridine | Copper | blue |

-continued

| No. | Diazo Component | Azo Component | Metal | Shade on Polyamide |
|---|---|---|---|---|
| 25 | 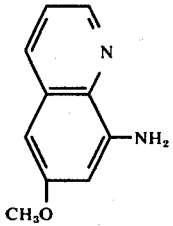 | 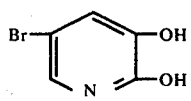 | Nickel | greenish-blue |
| 26 | " | " | Cobalt | bluish-green |
| 27 | 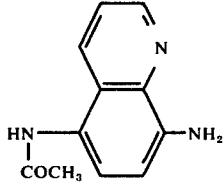 | " | Copper | blue |
| 28 | " | " | Nickel | greenish-blue |
| 29 | " | " | Cobalt | bluish-green |
| 30 | 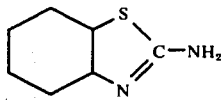 | 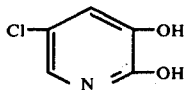 | Cobalt | violet |
| 31 | 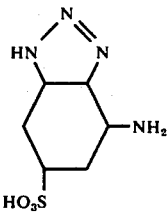 | 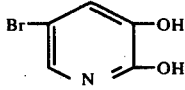 | Copper | violet |
| 32 | " | " | Nickel | reddish-violet |
| 33 | 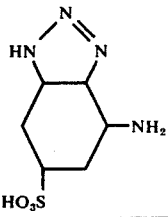 | 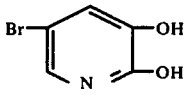 | Cobalt | violet |

INSTRUCTION FOR DYEING WOOL FABRIC 100 parts of wool fabric are introduced into a dyebath consisting of 3000 parts of water, 5 parts of 40% strength acetic acid, 10 parts of sodium sulphate, 2 parts of the ethylene oxide addition product of which the manufacture is described below, and 1 part of the 1:2 cobalt complex mentioned in Example 1, at a temperature of 50 to 60° C. After the bath has been heated to the boil over the course of half an hour, dyeing is carried out for a further hour at the boil. After rinsing and drying, a uniform green-blue dyeing results.

The manufacture of the ethylene oxide addition product can be carried out as follows:

100 parts of technical oleylamine are mixed with 1 part of finely divided sodium and heated to 140° C, after which ethylene oxide is introduced at 135° to 140° C. As soon as the ethylene oxide is taken up rapidly, the reaction temperature is lowered to 120°–125° C, and the introduction of the ethylene oxide is continued until 113 parts of ethylene oxide have been taken up. The reaction product thus obtainable gives a practically clear solution in water.

INSTRUCTION FOR DYEING POLYAMIDE.

100 parts of nylon-6,6 fabric are introduced into a dyebath consisting of 3000 parts of water, 5 parts of 40% strength acetic acid, 10 parts of sodium sulphate and 1 part of the copper complex mentioned in the example, at a temperature of 50° to 60° C. After the bath has been heated to the boil over the course of half an hour, dyeing is carried out for a further hour at the boil. After rinsing and drying, a uniform greenish-blue dyeing results.

INSTRUCTION FOR DYEING WOOLLEN KNITTING YARN 100 parts of woollen knitting yarn are introduced into a dyebath which contains 5 parts of ammonium sulphate and 1 part of the 1:2 chromium complex described in the example, per 3000 parts of water. The bath is heated to the boil over the course of half an hour and dyeing is carried out for a further hour at the boil. Thereafter the yarn is rinsed and dried. A uniform, greenish-blue dyeing is obtained.

We claim:

1. The 1:1 and 1:2 cobalt, nickel, copper or chromium complex of a compound of the formula

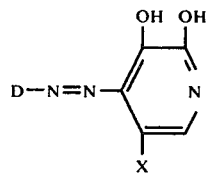

wherein
X is chloro or bromo, and
D is pyridinyl, quinolinyl benzthiazolyl, indazolyl, triazolyl, pyrazolyl, benztriazolyl, benzimidazolyl, thiazolyl, pyrazol-5-one-yl, thiadiazolyl, acrindinyl, carbazolyl or benzisothiazolyl, which is unsubstituted or substituted by chloro, bromo, nitro, cyano, lower alkyl, lower alkoxy, lower alkylsulfonyl, sulfo, carboxy, sulfamoyl, N-lower alkyl sulfamoyl, N-lower hydroxyalkyl sulfamoyl, formylamino, acetamido, benzoylamino, phenylsulfonamido, p-tolylsulfonamido, methylsulfonamido, carboxymethyoxyamino, carboethoxyamino, dimethylaminosulfonylamino, carboisopropoxyamino, phenyl, pyridyl, methylthio, ethylthio, phenylthio, cyclohexylthio, phenylsulfonyl, carbomethoxyethyl, phenylazo, napthylazo, sulfophenylazo or a fiber reactive radical selected from the group consisting of chloroacetyl, bromoacetyl, β-chloropropionyl, β-bromopropionyl, α,β-dichloropropionyl, α,β-dibromopropionyl, chloromaleyl, β-chloroacrylyl, β-bromoacrylyl, α-chloroacrylyl, α-bromoacrylyl, α,β-dichloroacrylyl, α,β-dibromoacrylyl, trichloroacrylyl and chlorocrotonyl; said fiber-reactive radical bonded via —NH— or aminosulfophenylazo.

2. A 1:1 or 1:2 cobalt, nickel, copper or chromium complex of a compound according to claim 1 of the formula

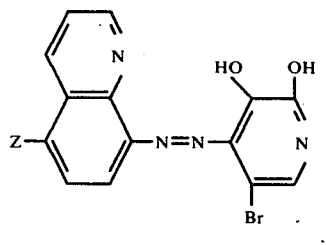

wherein
Z is chloro, bromo, sulfo, acetamido, sulfophenylazo, or aminosulfophenylazo wherein the amino group is substituted by said fiber reactive radical.

3. The complex according to claim 2 which is the copper or nickel complex.

4. The complex according to claim 1, wherein the fiber reactive radical is α,β-dibromopropionyl or α-bromoacrylyl.

5. The complex according to claim 2, wherein the fiber reactive radical is α,β-dibromopropionyl or α-bromoacrylyl.

* * * * *